US010337759B2

(12) United States Patent
McKie et al.

(10) Patent No.: US 10,337,759 B2
(45) Date of Patent: Jul. 2, 2019

(54) TRANSITION MODULE FOR AN ENERGY RECOVERY VENTILATOR UNIT

(71) Applicant: Lennox Industries Inc., Richardson, TX (US)

(72) Inventors: Justin McKie, Frisco, TX (US); Eric Perez, Hickory Creek, TX (US); Geoffrey Curtis, Plano, TX (US); Bryan Smith, McKinney, TX (US)

(73) Assignee: Lennox Industries, Inc., Richardson, TX (US)

( * ) Notice: Subject to any disclaimer, the term of this patent is extended or adjusted under 35 U.S.C. 154(b) by 327 days.

(21) Appl. No.: 15/260,636

(22) Filed: Sep. 9, 2016

(65) Prior Publication Data

US 2016/0377315 A1    Dec. 29, 2016

Related U.S. Application Data

(63) Continuation of application No. 13/274,562, filed on Oct. 17, 2011, now Pat. No. 9,441,843.

(51) Int. Cl.
| | |
|---|---|
| *F24F 12/00* | (2006.01) |
| *F24F 13/02* | (2006.01) |
| *F24F 3/044* | (2006.01) |

(52) U.S. Cl.
CPC .......... *F24F 13/0272* (2013.01); *F24F 3/044* (2013.01); *F24F 12/001* (2013.01); *F24F 12/006* (2013.01); *F24F 13/02* (2013.01); *F24F 13/0245* (2013.01); *Y02B 30/563* (2013.01); *Y10T 29/4935* (2015.01)

(58) Field of Classification Search
CPC .... F24F 12/006; F24F 13/0209; Y02B 30/563

USPC ........ 285/64, 424, 124.3, 124.4; 165/54, 56, 165/53, 57

See application file for complete search history.

(56) References Cited

U.S. PATENT DOCUMENTS

| | | |
|---|---|---|
| 1,094,309 A | 3/1914 | Daw |
| 3,252,508 A | 5/1966 | Goettl |
| 3,889,742 A | 6/1975 | Rush |
| 4,018,266 A | 4/1977 | Kay |
| 4,060,913 A | 12/1977 | Yoshida |
| 4,228,849 A | 10/1980 | Heinola |
| 4,342,359 A | 8/1982 | Baker |
| 4,497,361 A | 2/1985 | Hajicek |
| 4,611,653 A | 9/1986 | Ikemura |
| 4,727,931 A | 3/1988 | Berner |
| 4,754,651 A | 7/1988 | Shortridge |
| 4,784,212 A | 11/1988 | Brimer |

(Continued)

*Primary Examiner* — David Bochna
(74) *Attorney, Agent, or Firm* — Baker Botts L.L.P.

(57) ABSTRACT

A transition module for an energy recovery ventilator unit. The module comprises a frame having two opposing major surfaces with two separate through-hole openings therein. The module also comprises a self-sealing surface on one of the major surfaces and surrounding the two through-hole openings. One of the through-hole openings is configured to separately overlap with return air openings or supply air openings located in a first target side of one an energy recovery ventilator unit or an air handling unit and in a second target side of the other one of the energy recovery ventilator unit or the air handling unit. The other of the through-hole openings is configured to separately overlap with the other of the return air openings or the supply air openings located in the first and second sides.

12 Claims, 7 Drawing Sheets

(56) References Cited

U.S. PATENT DOCUMENTS

| | | |
|---|---|---|
| 4,825,936 A | 5/1989 | Hoagland |
| 4,834,004 A | 5/1989 | Butuk |
| 4,841,733 A | 6/1989 | Dussault |
| 4,843,838 A | 7/1989 | Trask |
| 4,854,726 A | 8/1989 | Lesley |
| 4,873,649 A | 10/1989 | Grald |
| 5,062,280 A | 11/1991 | Martin, Sr. |
| 5,069,272 A | 12/1991 | Chagnot |
| 5,173,922 A | 12/1992 | Arakawa |
| 5,183,098 A | 2/1993 | Chagnot |
| 5,238,052 A | 8/1993 | Chagnot |
| 5,316,073 A | 5/1994 | Klaus |
| 5,372,182 A | 12/1994 | Gore |
| 5,376,045 A | 12/1994 | Kiser |
| 5,423,187 A | 6/1995 | Fournier |
| 5,482,108 A | 1/1996 | Essle |
| 5,497,823 A | 3/1996 | Davis |
| 5,515,909 A | 5/1996 | Tanaka |
| 5,564,626 A | 10/1996 | Kettler |
| 5,726,424 A | 3/1998 | Koether |
| 5,728,289 A | 3/1998 | Kirchnavy |
| 5,761,908 A | 6/1998 | Oas |
| 5,826,641 A | 10/1998 | Bierwirth |
| 5,839,096 A | 11/1998 | Lyons |
| 5,927,096 A | 7/1999 | Piccione |
| 6,009,763 A | 1/2000 | Berckmans |
| 6,039,109 A | 3/2000 | Chagnot |
| 6,209,622 B1 | 4/2001 | Lagace |
| 6,223,544 B1 | 5/2001 | Seem |
| 6,289,974 B1 | 9/2001 | DeGregoria |
| 6,328,095 B1 | 12/2001 | Felber |
| 6,355,091 B1 | 3/2002 | Felber |
| 6,415,616 B1 | 7/2002 | Kim |
| 6,575,228 B1 | 6/2003 | Ragland |
| 6,672,627 B1 | 1/2004 | Mariman |
| 6,776,228 B2 | 8/2004 | Pedersen |
| 6,925,999 B2 | 8/2005 | Hugghins |
| 6,929,057 B1 | 8/2005 | Sahota |
| 7,012,516 B2 | 3/2006 | Laurosch |
| 7,073,566 B2 | 7/2006 | Lagace |
| 7,090,000 B2 | 8/2006 | Taylor |
| 7,100,634 B2 | 9/2006 | Robb |
| 7,231,967 B2 | 6/2007 | Haglid |
| 7,308,384 B2 | 12/2007 | Shah |
| 7,440,864 B2 | 10/2008 | Otto |
| 7,458,228 B2 | 12/2008 | Lagace |
| 7,716,936 B2 | 5/2010 | Bailey |
| 7,841,381 B2 | 11/2010 | Chagnot |
| 7,856,289 B2 | 12/2010 | Schanin |
| 7,886,986 B2 | 2/2011 | Fischer, Jr. |
| 8,123,518 B2 | 2/2012 | Nordberg |
| 2002/0139514 A1 | 10/2002 | Lagace |
| 2002/0153133 A1 | 10/2002 | Haglid |
| 2003/0085814 A1 | 5/2003 | Griep |
| 2003/0140638 A1 | 7/2003 | Arshansky |
| 2003/0178411 A1 | 9/2003 | Manganiello |
| 2004/0155466 A1 | 8/2004 | Sodemann |
| 2005/0236150 A1 | 10/2005 | Chagnot |
| 2005/0252229 A1 | 11/2005 | Moratalla |
| 2006/0035580 A1 | 2/2006 | Anderson |
| 2006/0054302 A1 | 3/2006 | Cho |
| 2006/0219381 A1 | 10/2006 | Lagace |
| 2007/0045439 A1 | 3/2007 | Wolfson |
| 2007/0045601 A1 | 3/2007 | Rhee |
| 2007/0144187 A1 | 6/2007 | Lee |
| 2007/0171647 A1 | 7/2007 | Artwohl |
| 2007/0205297 A1 | 9/2007 | Finkam |
| 2008/0033599 A1 | 2/2008 | Aminpour |
| 2008/0076346 A1 | 3/2008 | Ahmed |
| 2008/0144238 A1 | 6/2008 | Cline |
| 2008/0208531 A1 | 8/2008 | Felcman |
| 2008/0282494 A1 | 11/2008 | Won |
| 2009/0032604 A1 | 2/2009 | Miller |
| 2009/0090117 A1 | 4/2009 | McSweeney |
| 2009/0095096 A1 | 4/2009 | Dean |
| 2009/0120111 A1 | 5/2009 | Taras |
| 2009/0156966 A1 | 6/2009 | Kontschieder |
| 2009/0165644 A1 | 7/2009 | Campbell |
| 2009/0215375 A1 | 8/2009 | Hagensen |
| 2009/0222139 A1 | 9/2009 | Federspiel |
| 2010/0262298 A1 | 10/2010 | Johnson |
| 2013/0087302 A1 | 4/2013 | McKie |
| 2013/0090051 A1 | 4/2013 | McKie |
| 2013/0090769 A1 | 4/2013 | McKie |
| 2013/0092345 A1 | 4/2013 | McKie |
| 2013/0092346 A1 | 4/2013 | McKie |
| 2013/0095744 A1 | 4/2013 | McKie |
| 2013/0118188 A1 | 5/2013 | McKie |
| 2013/0158719 A1 | 6/2013 | McKie |

TRANSITION MODULE FOR AN ENERGY RECOVERY VENTILATOR UNIT

CROSS REFERENCE TO RELATED INFORMATION

This application is a continuation of U.S. patent application Ser. No. 13/274,562, filed Oct. 17, 2011, titled Transition Module for an Energy Recovery Ventilator Unit, now U.S. Pat. No. 9,441,843, issued Sep. 13, 2016, which is related to U.S. patent application Ser. No. 13/274,530 by McKie et al., entitled, "Energy Recovery Ventilator Unit with Offset and Overlapping Enthalpy Wheels" ("Appl-1"); U.S. patent application Ser. No. 13/274,587 by McKie et al., entitled "Sensor Mounting Panel for an Energy Recovery Ventilator Unit" ("Appl-2"); and U.S. Pat. No. 9,395,097 by McKie et al., entitled, "Layout for an Energy Recovery Ventilator System" ("Appl-3"), which are all filed on the same date as the present application, and, which are incorporated herein by reference in their entirety. One or more of the above applications may describe embodiments of Energy Recovery Ventilator Units and components thereof that may be suitable for making and/or use in some of the embodiments described herein.

TECHNICAL FIELD

This application is directed, in general, to space conditioning systems and methods for conditioning the temperature and humidity of an enclosed space using an energy recovery ventilator, and in particular to a transition module for energy recovery ventilators.

BACKGROUND OF THE INVENTION

Energy recovery ventilator units are becoming an important addition to space conditioning systems to maintain air quality while minimizing energy losses. Unfortunately, there are often high shipping and installation costs associated with installing the energy recovery ventilator units. It is desirable to decrease such costs.

BRIEF SUMMARY OF THE INVENTION

One embodiment of the present disclosure is transition module for an energy recovery ventilator unit. The module comprises a frame having two opposing major surfaces with two separate through-hole openings therein. The module also comprises a self-sealing surface on one of the major surfaces and surrounding the two through-hole openings. One of the through-hole openings is configured to separately overlap with return air openings or supply air openings located in a first target side of one of an energy recovery ventilator unit or an air handling unit and in a second target side of the other one of the energy recovery ventilator unit or the air handling unit. The other of the through-hole openings is configured to separately overlap with the other of the return air openings or the supply air openings located in the first and second sides.

Another embodiment of the present disclosure is a method of manufacturing a transition module for an energy recovery ventilator unit. The method comprises forming the above-described frame and forming a self-sealing surface on one of the major surfaces and surrounding the two through-hole openings.

The foregoing has outlined rather broadly the features and technical advantages of the present invention in order that the detailed description of the invention that follows may be better understood. Additional features and advantages of the invention will be described hereinafter which form the subject of the claims of the invention. It should be appreciated by those skilled in the art that the conception and specific embodiment disclosed may be readily utilized as a basis for modifying or designing other structures for carrying out the same purposes of the present invention. It should also be realized by those skilled in the art that such equivalent constructions do not depart from the spirit and scope of the invention as set forth in the appended claims. The novel features which are believed to be characteristic of the invention, both as to its organization and method of operation, together with further objects and advantages will be better understood from the following description when considered in connection with the accompanying figures. It is to be expressly understood, however, that each of the figures is provided for the purpose of illustration and description only and is not intended as a definition of the limits of the present invention.

BRIEF DESCRIPTION OF THE DRAWINGS

For a more complete understanding of the present invention, reference is now made to the following descriptions taken in conjunction with the accompanying drawings, in which.

DETAILED DESCRIPTION OF THE INVENTION

The term, "or," as used herein, refers to a non-exclusive or, unless otherwise indicated. Also, the various embodiments described herein are not necessarily mutually exclusive, as some embodiments can be combined with one or more other embodiments to form new embodiments.

As part of the present disclosure, it was recognized that an important cost associated with an energy recovery ventilator unit installation is due to the packaging and shipping of the entire energy recovery ventilator unit, often in a single large crate. The crate is transported to the installation site, e.g., a roof top, where it is then assembled and connected to an air handling unit. Often a crane or helicopter, at additional expense, is required to lift the crate to the installation site.

The crate is large because the exterior wall panels include additional lengths to provide a built-in an adaptive transition to, e.g., a roof-air air handling unit.

Once at the installation site, the large panels have to be assembled and then coupled to the air-handling unit. Typically, a lengthy and costly process is required to piece the panels together. Then more time and expense is required to attach the assembled energy recovery ventilator unit, via its built-in transition, to the air handling unit. Often the installation process requires the entire energy recovery ventilator unit to be lifted or tilted to a suitable position for coupling to the air-handler. The installation process can also include laboriously and manually forming air and water tight sealing rings made of a caulking material, such as silicone, between the built-in transition part of energy recovery ventilator unit and air handling unit.

Embodiments of the disclosure address these problems by providing a separate transition module for an energy recovery ventilator unit. Because the transition module is a separate piece, the panels of the energy recovery ventilator unit can be reduced in size, thereby reducing shipping and installation costs. The transition module is configured to be easily mounted to the energy recovery ventilator unit, the air handler, or both, with no or a minimum of assembly required. Coupling to the air handling unit often can be made without having to lift or tilt the energy recovery ventilator unit. Additionally, the transition module includes a self-sealing surface that eliminates the need to manually form sealing rings onsite, thereby further reducing installing time and costs. These and other beneficial features will become further apparent in the example embodiments presented herein.

Figure 1:
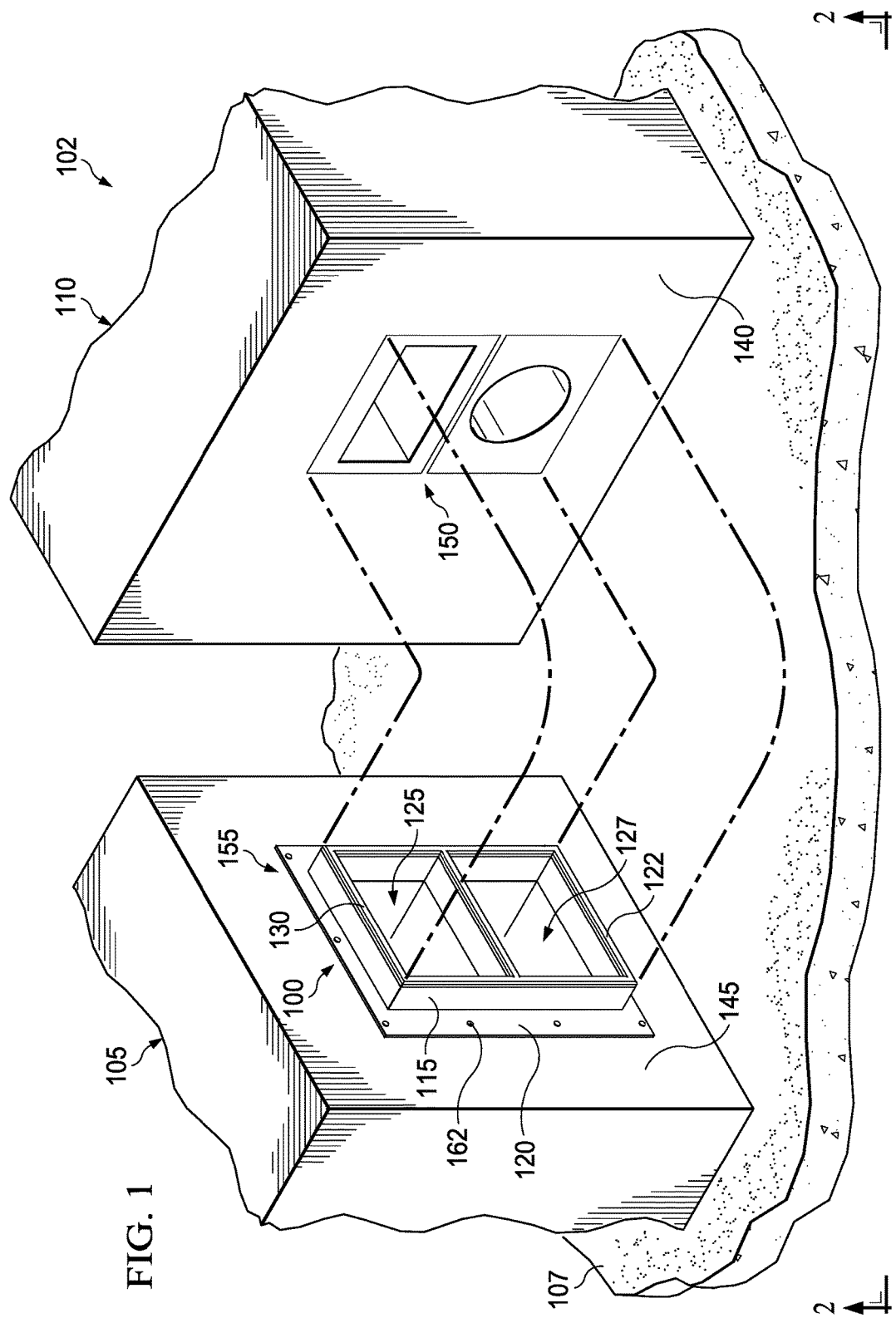
FIG. 1 presents an exploded three-dimensional view of an example transition module of the disclosure.
Figure 2:
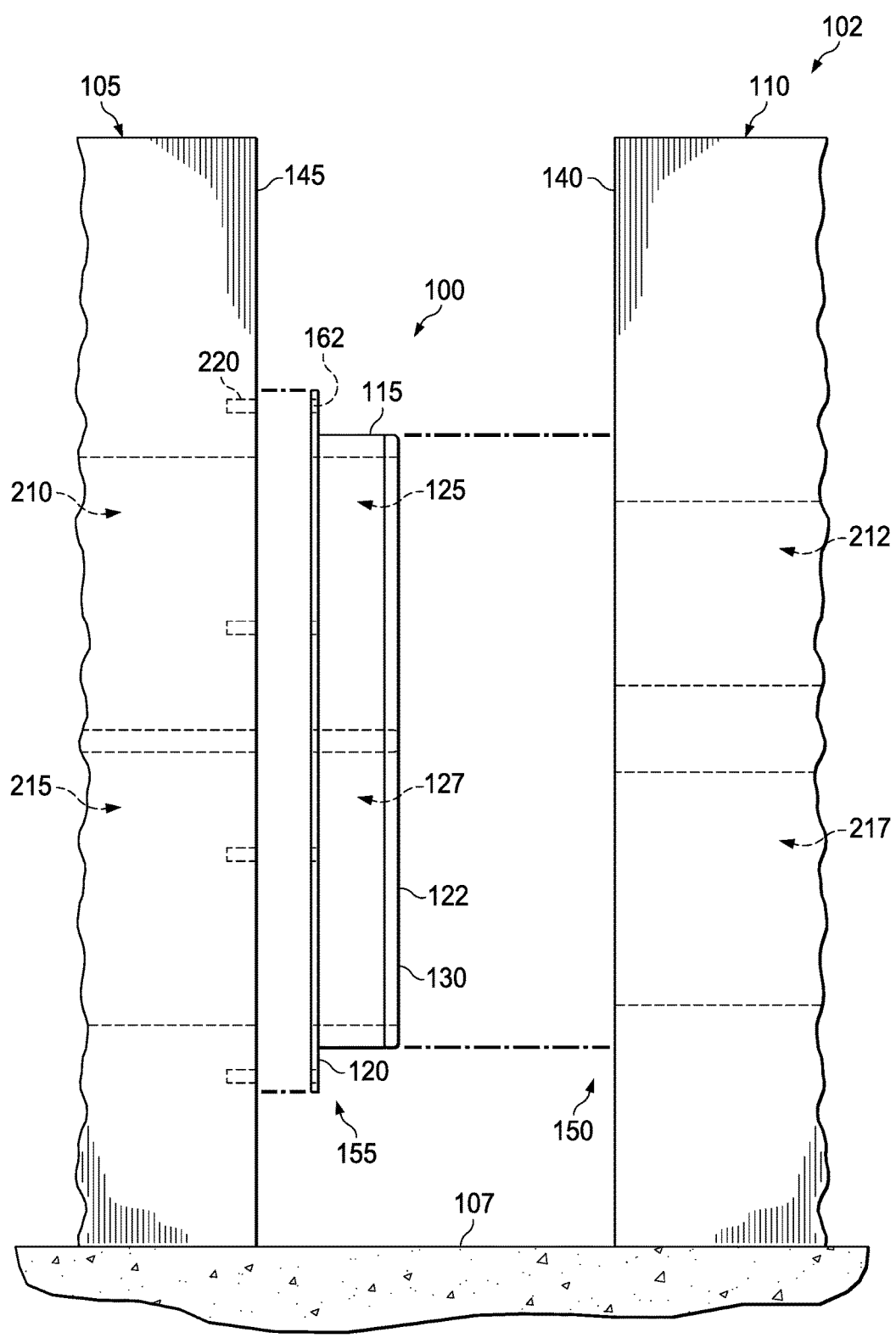
FIG. 2 presents an exploded side view of the example transition module presented in FIG. 1, along view line 2 as shown FIG. 1.

One embodiment of the present disclosure is a transition module for an energy recovery ventilator unit. FIG. 1 presents an exploded three-dimensional view of an example transition module 100 of the disclosure. FIG. 2 presents an exploded side view of the example transition module 100 presented in FIG. 1, along view line 2 as shown FIG. 1. As further illustrated, embodiments of the transition module 100 can be part of a space conditional system 102 that includes the energy recovery ventilator unit 105 and the air handling unit 110. The air handling unit 105 can be a roof-top unit (e.g., mounted on a base 107 such as a roof, a floor, the ground or similar mounting structure) or other outdoor packaged unit, or other type of air handling unit that could be coupled to the energy recovery ventilator unit 105 as part of improving indoor air quality or reducing the energy cost of the system 102.

With continuing reference to FIGS. 1-2 throughout, the module 100 comprises a frame 115. The frame can be composed of metal frame such as aluminum, although other metals or materials could be used, if desired. The frame 115 has two opposing major surfaces 120, 122 with two separate through-hole openings 125, 127 therein. The frame 115 also has a self-sealing surface 130 on one of the major surfaces (e.g., surface 122 in the illustrated example) and surrounding the two through-hole openings 125, 127.

One of the through-hole openings (e.g., opening 125) is configured to separately overlap with return air openings (e.g., opening 210, or opening 212, in some cases) or supply air openings (e.g., opening 215, or opening 217 in some cases) located in a first target side (e.g., one of side 140 or side 145) of one an energy recovery ventilator unit 105 or an air handling unit 110 and in a second target side (e.g., the other of side 145 or side 140) of the other one of the energy recovery ventilator unit 105 or the air handling unit 110. The other of the through-hole openings (e.g., openings 215 and opening 217 in this example), is configured to separately overlap with the other of the return air openings (e.g., opening 215, 217 in this example) or the supply air openings (e.g., opening 210 and opening 212 in some case) located in the first and second sides 140, 145.

As illustrated in FIGS. 1-2, in some embodiments, an upper one of the two through-hole openings (e.g., opening 125) is configured to overlap with the supply air openings 210, 212 of the energy recovery ventilator unit 105 and the air handling unit 110, and, a lower one of the two through-hole openings (e.g., opening 127) is configured to overlap with the return air openings 215, 217 of the energy recovery ventilator unit 105 and the air handling unit 110.

In other embodiments, however, the upper one of the two through-hole openings could be configured to overlap with the return air openings and the lower one of the two through-hole openings is configured to overlap with the supply air openings. Still other configurations, such as horizontal or side-by-side supply and return air configurations would be apparent to one of ordinary skill in the art based on the present disclosure.

As further illustrated in FIGS. 1-2, in some embodiments, the self-sealing surface 130 can be configured to contact the first target side (e.g., side 140) of the air handling unit 110 such that the two through-hole openings each separately form air-tight and moisture-tight seals around the supply air opening 212 and the return air opening 217 of the air handling unit 110. That is, when the self-sealing surface 130 contacts the side 140 of the air handling unit 110, air and moisture does not exchange across the interface 150 between the self-sealing surface 130 and the side 140.

Conversely, in other embodiments, the self-sealing surface 130 can be configured to contact the target side 145 of the energy recovery ventilator unit 105 such that the two through-hole openings 125, 127 each separately form air-tight and moisture-tight seals around the supply air opening 210 and the return air opening 215 of the energy recovery ventilator unit 105.

To facilitate forming an air-tight and moisture-tight seal, in some embodiments the self-sealing surface 130 can include one or more gaskets configured to individually surround the return air opening (e.g., opening 217 in the example) and the supply air opening of the target side (e.g., side 140 in the example) side that the self-sealing surface 130 is configured to contact. In some embodiment, to facilitate forming the air-tight and moisture tight seal, a single continuous gasket is used as the self-sealing surface 130. In some embodiment, to facilitate forming the air-tight and moisture tight seal, the self-sealing surface 130 is composed of a pliable material. In some cases, e.g., the one or more gaskets can be composed of polyvinyl chloride, rubber or silicone. In some cases, to facilitate weather resistance or durability, the gasket can include a closed cell polymer foam material (e.g., a closed-cell polyvinyl chloride polymer foam). Based upon the present disclosure, one of ordinary skill in the art would understand the other types of material that could be used to form the self-sealing surface 130.

In certain embodiments of the modules 100, the other major surface, that is, the major surface that the self-sealing surface 130 is not on (e.g., surface 120 in the illustrated example), is configured as a mounting surface to attach to the other one of the target side or the second target side (e.g., side 145 in the illustrated example) to form an air-tight and moisture tight connection. That is, when the mounting surface 120 is attached to the target side (e.g., side 145 of the energy recovery unit 105), air and moisture does not exchange across the interface 155 between the mounting surface 120 and the target side.

For example, in some cases, the mounting surface 120 can include through-holes 160 configured to match mounting openings 162 in the target side or the second target side. In such cases, the through-holes 160 can be configured to accommodate bolts, screws, rivets and similar structure to facilitate attaching the mounting surface 120 to the target side (e.g., side 145). In some embodiments, the mounting surface 120 can include an adhesive or gasket layer to facilitate attachment and forming of an air-tight and moisture-tight connection to the target side.

To facilitate forming an air-tight and moisture-tight seal or connection, in some embodiments of the module 100, the major surfaces 120, 122 are configured to have contours that substantially match the respective contour of the first or second target sides 140, 145 that the major surfaces 120, 122 are configured to contact. For instance, as illustrated in FIGS. 1-2 when the target sides 140, 145 have a planar contour then the major surfaces 120, 122 can have a planar contour. However, if a target side (e.g., side 140) has, e.g., a convex contour then the major surface (e.g., surface 122) contacting that side could have a concave contour that matches the convex contour of the target side so that the self-sealing surface 130 can form an air-tight and moisture-tight seal to the side.

Figure 3:
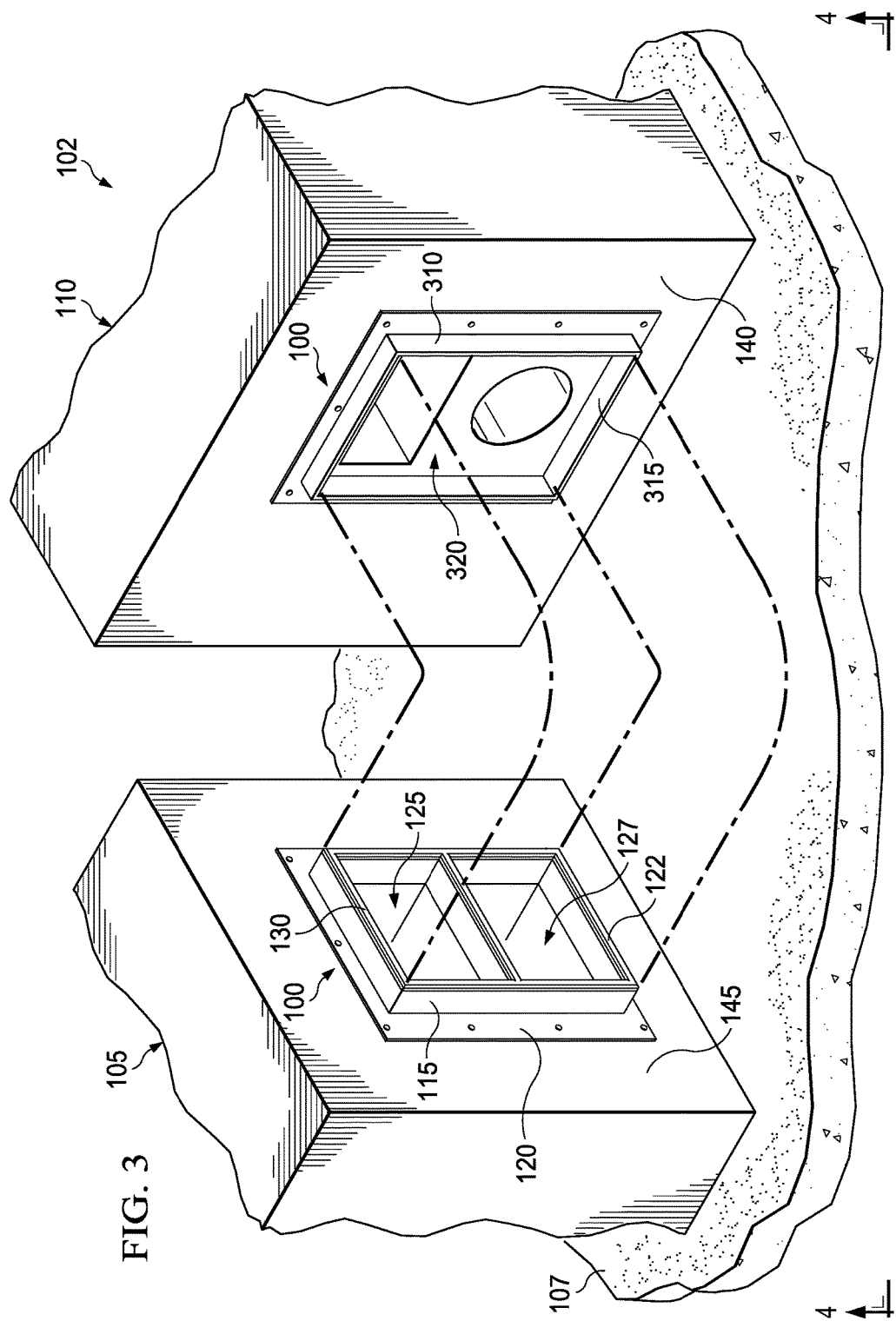
FIG. 3 which presents an exploded three-dimensional view of another example transition module of the disclosure, analogous to that presented in FIG. 1.
Figure 4:
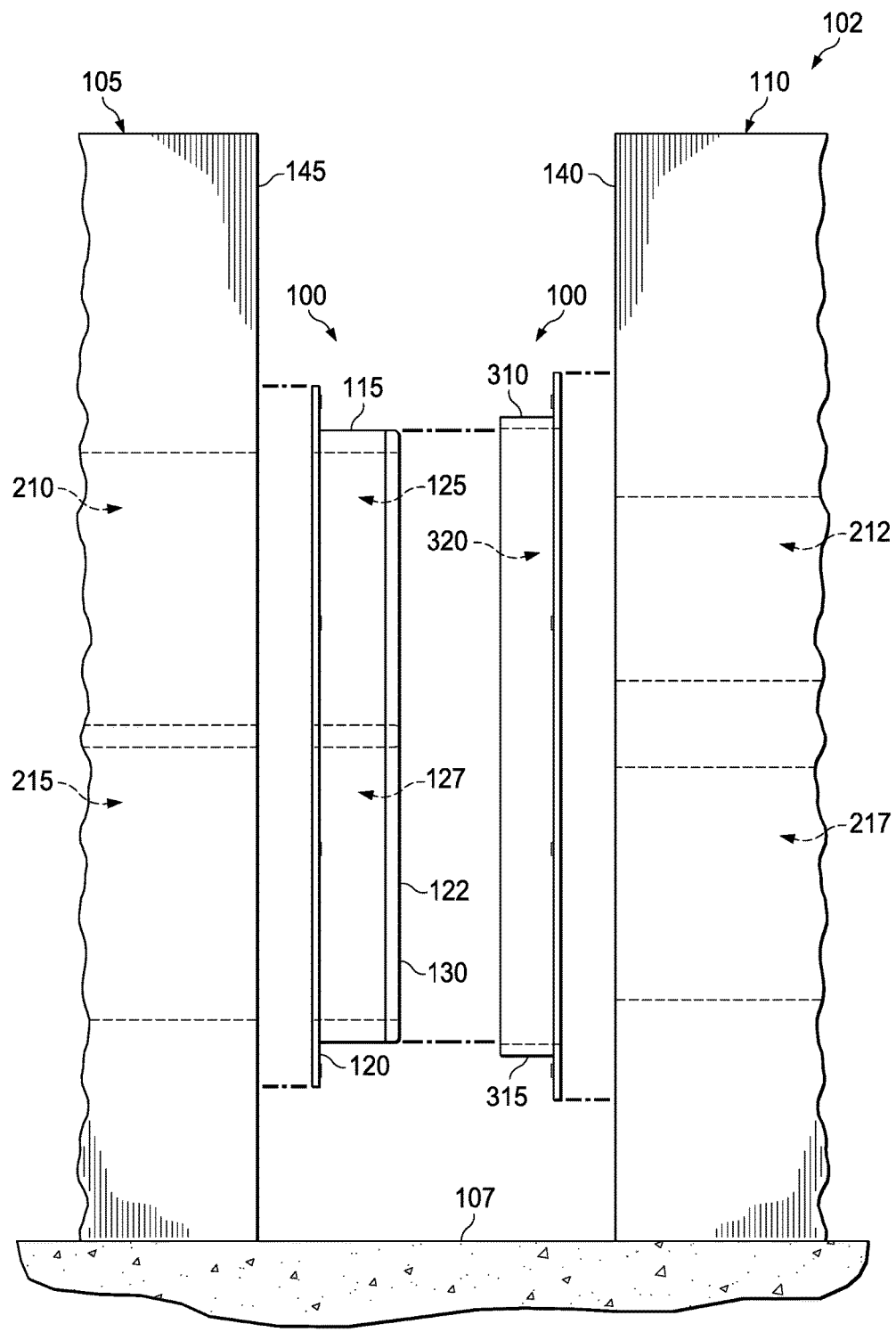
FIG. 4 presents an exploded side view of the example transition module presented in FIG. 3, along view line 4 as shown FIG. 3, analogous to the side view presented in FIG. 2.

FIG. 3 presents an exploded three-dimensional view of another example transition module 100 of the disclosure, analogous to that presented in FIG. 1. FIG. 4 presents an exploded a side view of the example transition module 100 presented in FIG. 3, along view line 4 as shown FIG. 3, analogous to the side view presented in FIG. 2. As shown in FIGS. 3-4, some embodiments of the module 100 can further include a shielding flange 310 that surrounds the self-sealing surface 130. As illustrated, the shielding flange 310 can have walls 315 that are substantially perpendicular to a first or second target side (e.g., side 140 in the illustrated example) that the shielding flange 310 is mounted to. An opening 320 in the flange 310, e.g., as defined by the walls 315, is configured to accommodate a portion of frame 110 therethrough such that the self-sealing surface 130 can contact the side 140. When the self-sealing surface 130 contacts the target side 140, the shielding flange 310 surrounds the self-sealing surface 130 and thereby helps to prevent moisture (e.g., rain water), sunlight or other weathering elements from directly contacting the sealed interface 150.

Figure 5:
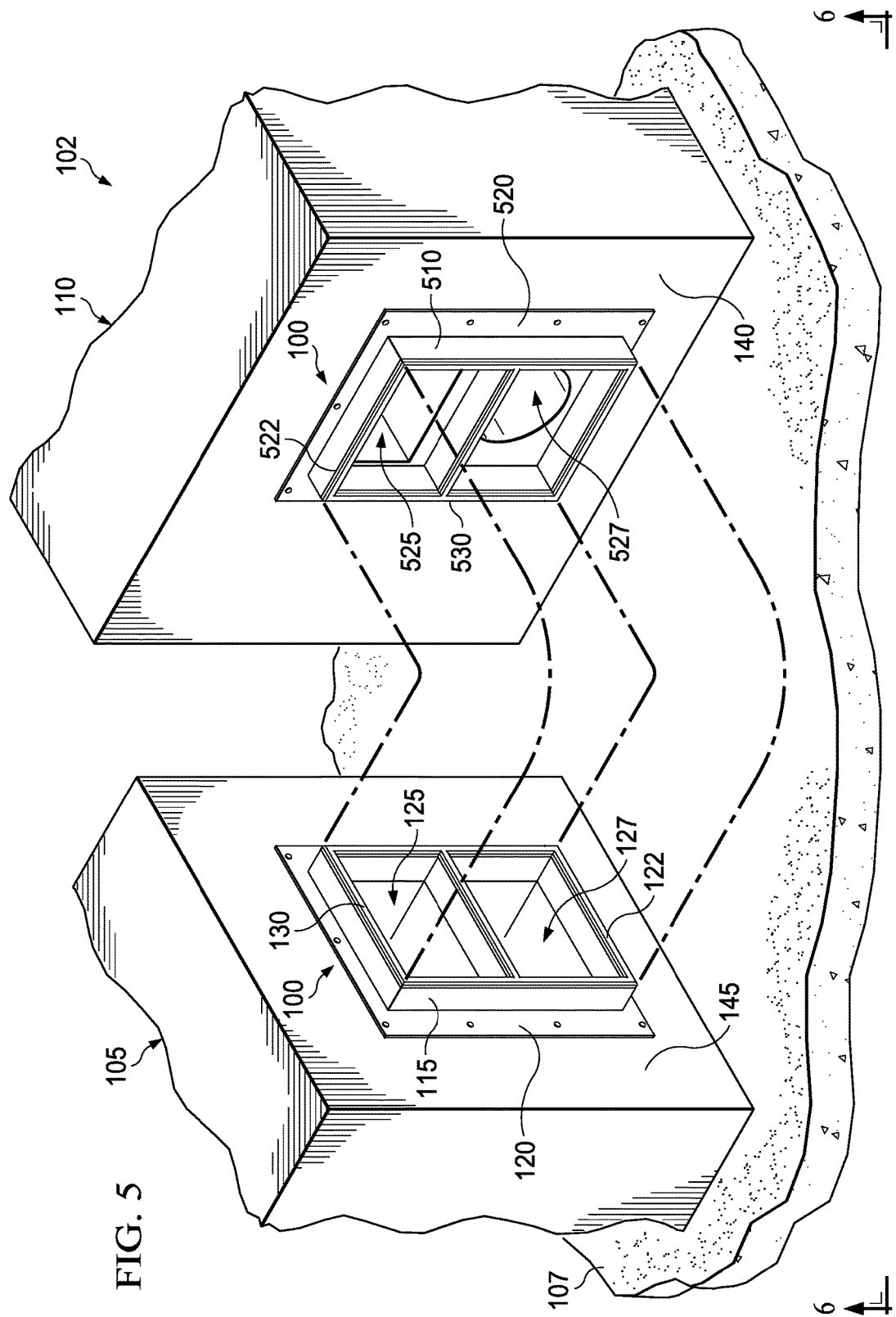
FIG. 5 presents an exploded three-dimensional view of another transition module of the disclosure, analogous to that presented in FIG. 1.
Figure 6:
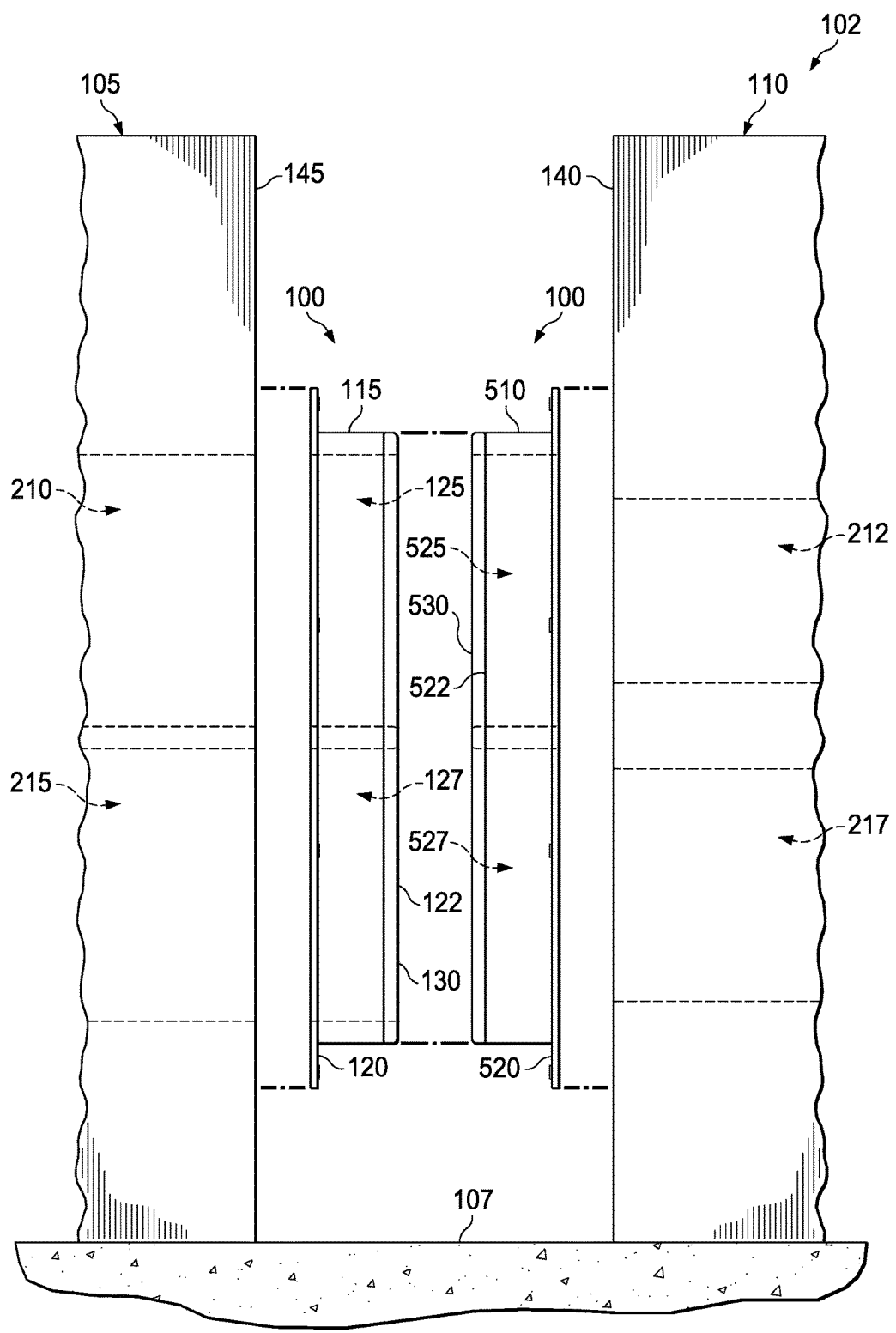
FIG. 6 presents an exploded side view of the example transition module presented in FIG. 5, along view line 6 as shown FIG. 5, analogous to the side view presented in FIG. 2.

FIG. 5 presents an exploded three-dimensional view of another transition module 100 of the disclosure, analogous to that presented in FIG. 1. FIG. 6 presents an exploded side view of the example transition module 100 presented in FIG. 5, along view line 6 as shown FIG. 5, analogous to the side view presented in FIG. 2. As illustrated in FIGS. 5-6, some embodiments of the module 100 can further include a second frame 510. The second frame 510 can have two opposing major surfaces 520, 522 with two separate second through-hole openings 525, 527 therein. One of the major surfaces (e.g., surface 522) of the second frame 510 is configured to be contacted by the self-sealing surface 130 on the first frame 115 such that the two through-hole openings 125, 127 of the first frame 115 and the second two through-hole openings 525, 527 of the second frame 510 are contiguous with each other. The other major surface (e.g., surface 520) of the second frame 510 can be attached to the target side of the energy recovery ventilator unit 105 or the air handling unit 110 that the first frame 115 is not attached to (e.g., side 140 of the air handling unit 110).

As further illustrated in FIGS. 5-6, the second frame 510 can further include a second self-sealing surface 530 on the one major surface 522 of the second frame 510 that is configured to be contacted by the self-sealing surface 130 on the first frame 115. The second self-sealing surface 530 can be composed of the same material as the first self-sealing surface 130, or a different material.

Based on the present disclosure, one skilled in the art would appreciate how the different features from the various embodiments depicted in FIGS. 1-6 could be combined. For instance, in some cases, the major surface 522 of the second frame 510 that is configured to be contacted by the self-sealing surface 130 can further include a shielding flange 310 configured to surround the self-sealing surface 130 when the self-sealing surface 130 contacts the major surface 522 of the second frame 510.

Figure 7:
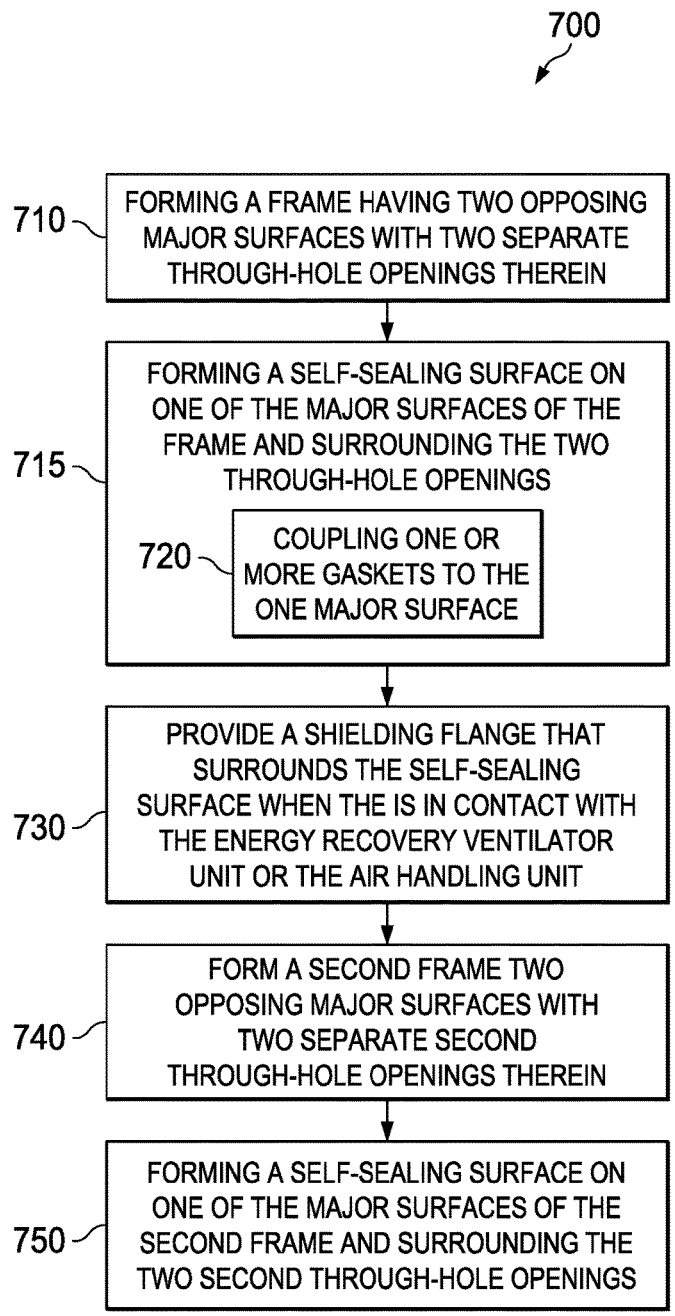
FIG. 7 presents a flow diagram of an example method of manufacturing a transition module for an energy recovery ventilator unit of the disclosure, including any of the example embodiments discussed in the context of FIGS. 1-6.

Another embodiment of the present disclosure is a method of manufacturing a transition module for an energy recovery ventilator unit, such as any of the modules 100 discussed in the context of FIGS. 1-6. FIG. 7 presents a flow diagram of an example method 700 of manufacture.

With continuing reference to FIGS. 1-6 throughout, the example method 700 comprises a step 710 of forming a frame 115 having two opposing major surfaces 120, 122 with two separate through-hole openings 125, 127 therein. For instance, as part of step 710, one or more material sheets (e.g., an aluminum sheet) can be cut (e.g., via laser or mechanical cutting) to form the openings 120, 122 and bent or assembled to form the opposing major surfaces 120, 122.

As discussed above, one of the through-hole openings (e.g., one of openings 125 or 127) is configured to separately overlap with supply air openings 210, 212 or returned air openings 215, 217 located in a first target side (e.g., one of sides 140 or 145) of one of an energy recovery ventilator unit 105 or an air handling unit 110 and in a second target side (e.g., the other or one of sides 140 or 145) of the other one of the energy recovery ventilator unit 105 or the air handling unit 110. The other of the through-hole openings (e.g., the other of openings 125 or 127) is configured to separately overlap with the other of the return air openings 210, 212 or the supply air openings 215, 217 located in the first and second sides 140, 145.

The method 700 further comprises a step 715 of forming a self-sealing surface 130 on one of the major surfaces 122 and surrounding the two through-hole openings 125, 127. In some cases, forming the self-sealing surface 130 in step 715 can include a step 720 of forming the self-sealing surface can include coupling (e.g., using an adhesive material) one or more gaskets to the one major surface 122.

Some embodiments of the method 700 can further include a step 730 of providing a shielding flange 310 that surrounds the self-sealing surface 130 when the self-sealing surface 130 is in contact with the target side (e.g., side 140 or side 145) of the energy recovery ventilator unit 105 or the air handling unit 110. For instance, providing the shielding flange 310 in step 530 can include cutting, bending and assembling material sheets, similar to that done to form the frame in step 510.

Some embodiments of the method 700 can further include a step 740 of forming a second frame 510 having two opposing major surfaces 520, 522 with two separate second through-hole openings 425, 527 therein. One of major surfaces (e.g., surface 520) of the second frame 510 is configured to be contacted by the self-sealing surface 130 such that the two through-hole openings 125, 127 and the second two through-hole openings 525, 527 are contiguous with each other.

Some embodiments of the method 700 can further include a step 750 of forming a second self-sealing surface 530 on one of the major surfaces (e.g., surface 522) of the second frame 520 and surrounding the two through-hole openings 525, 527 in the second frame 510.

Although the present invention and its advantages have been described in detail, it should be understood that various changes, substitutions and alterations can be made herein without departing from the spirit and scope of the invention as defined by the appended claims. Moreover, the scope of the present application is not intended to be limited to the particular embodiments of the process, machine, manufacture, composition of matter, means, methods and steps described in the specification. As one of ordinary skill in the art will readily appreciate from the disclosure of the present invention, processes, machines, manufacture, compositions of matter, means, methods, or steps, presently existing or later to be developed that perform substantially the same function or achieve substantially the same result as the corresponding embodiments described herein may be utilized according to the present invention. Accordingly, the appended claims are intended to include within their scope such processes, machines, manufacture, compositions of matter, means, methods, or steps.

What is claimed is:

1. A transition module for an energy recovery ventilator unit, comprising:
   a first frame having:
      two opposing major surfaces with first and second separated through-hole openings therein; and
      a self-sealing surface on one of the major surfaces surrounding the two through-hole openings, wherein
      the first through-hole opening is configured to overlap with return air openings located in a side of an energy recovery ventilator unit and in a side of an air handling unit, and
      the second through-hole opening is configured to overlap with the supply air openings located in the side of the energy recovery ventilator unit and the side of the air handling unit,
      wherein the self-sealing surface is part of two separated air-tight and moisture-tight sealed passageways of the return air flowing through the first through-hole opening of the frame between the side of the energy recovery ventilator unit and the side of the air handling unit, and, of the supply air flowing through the second through-hole opening of the frame between the side of the energy recovery ventilator unit and the side of the air handling unit;
      further wherein the major surface that the self-sealing surface is not on, is configured as a mounting surface to attach to the side of the energy recovery ventilator unit or the side of the air handling unit and the mounting surface includes an adhesive to facilitate attachment to the target side;
      and a second frame comprising: two opposing major surfaces with two separate second first and second through-hole openings therein, wherein one of the major surfaces of the second frame is configured to be contacted by the self-sealing surface such that the first and second through-hole openings and the second first and second through-hole openings are contiguous with each other and form part of the two separated air-tight and moisture-tight sealed passageways, and wherein the second frame overlaps the first frame.

2. The transition module of claim 1, wherein the second frame comprises the side of the air handling unit such that the first and second through-hole openings each form part of the air-tight and moisture-tight seals of the supply air flow and the return air flow.

3. The transition module of claim 1, wherein the second frame comprises the side of the energy recovery ventilator unit such that the first and second through-hole openings each form part of the air-tight and moisture-tight sealed passageways.

4. The transition module of claim 1, wherein the self-sealing surface include one or more gaskets configured to individually surround the return air opening and the supply air opening of the side of the energy recovery ventilator unit or the side of the air handling unit that the self-sealing surface is configured to contact.

5. The transition module of claim 1, wherein the major surfaces are configured to have contours that substantially match the respective contour of the side of the energy recovery ventilator unit and the side of the air handling unit that the major surfaces are configured to contact, respectively.

6. The transition module of claim 1, wherein the other major surface of the second frame is attached to the side of the energy recovery ventilator unit or the side of the air handling unit to which the first frame is not attached.

7. The transition module of claim 1, wherein the second frame further includes a second self-sealing surface on the one major surface of the second frame that is configured to contact the self-sealing surface of the first frame.

8. The transition module of claim 1, wherein the major surface of the second frame that is configured to be contacted by the self-sealing surface is surrounded by a shielding flange that is configured to surround the self-sealing surface when the self-sealing surface contacts the major surface of the second frame.

9. A method of manufacturing a transition module for an energy recovery ventilator unit, comprising:
   forming a first frame having:
      two opposing major surfaces with first and second separated through-hole openings therein; and
      forming a self-sealing surface on one of the major surfaces and surrounding the first and second through-hole openings, wherein
      the first through-hole opening overlaps with supply air openings located in a side of an energy recovery ventilator unit and in a side of an air handling unit, and
      the second through-hole opening overlaps with return air openings located in the side of the energy recovery ventilator unit and in the side of the air handling unit,
      wherein the self-sealing surface is part of two separated air tight and moisture tight sealed passageways of the return air flowing through the first through-hole opening of the frame between the side of the energy ventilator recovery unit and the side of the air handling unit, and, of the supply air flowing through the second through-hole opening of the frame between the side of the side of the energy recovery ventilator unit and the side of the air handling unit;
      further wherein the major surface that the self-sealing surface is not on, is configured as a mounting surface to attach to the side of the energy recovery ventilator unit or the side of the air handling unit and the mounting surface includes an adhesive to facilitate attachment to the target side; and
      forming a second frame having: two opposing major surfaces with second first and second separated through-hole openings therein, wherein one of the major surfaces of the second frame are configured to be contacted by the self-sealing surface of the frame such that the first and second through-hole openings and the second first and second through-hole openings are contiguous with each other and form part of the two separated air tight and moisture tight sealed passageways, and wherein the second frame overlaps the first frame.

10. The method of claim 9, wherein forming the self-sealing surface includes coupling a gasket to the one major surface.

11. The method of claim 9, providing a shielding flange that surrounds the self-sealing surface when the second frame comprises the target side of the energy recovery ventilator unit or the air handling unit.

12. The method of claim 9, further including forming a second self-sealing surface on one of the major surfaces of the second frame and surrounding the two through-hole openings in the second frame, wherein the second self-sealing surface forms part of the two separated air tight and moisture tight sealed passageways.

* * * * *